UNITED STATES PATENT OFFICE.

WILLIAM B. GLEASON, OF BOSTON, MASSACHUSETTS.

IMPROVED PLASTIC MATERIAL TO IMITATE WOOD AND OTHER SUBSTANCES.

Specification forming part of Letters Patent No. 71,294, dated November 26, 1867.

Be it known that I, WILLIAM B. GLEASON, of Boston, in the county of Suffolk, in the State of Massachusetts, have discovered that for very many uses an imitation of articles carved in wood, for useful and for ornamental purposes, may be made by pressing into suitable molds proper quantities of a mixture of glue and sawdust while in a plastic condition, said articles in imitation being for many purposes as good as or better than articles similar in appearance, but carved in wood, over which my invention has the merit of cheapness; and I do hereby declare that the following description is sufficiently full and exact to enable persons skilled in the art to which my invention most nearly appertains to practice said invention, which may be stated as consisting in articles manufactured from a compound formed by combining glue and sawdust, and by compressing said compound into molds while in a plastic condition.

The prime object of my invention is the production of molded ornaments of considerable lightness with a good degree of cohesion, which will answer most of the requirements of many ornamental wood carvings, especially if not exposed to moisture, and which will be an improved substitute for the molded ornaments known as "putty-work" to picture and mirror frame makers.

In practice, I mix, in a hot solution of glue, sawdust of a kind which will in the mixture produce the color of the wood which I desire to imitate, stating, however, that the mixture of glue in solution with sawdust from any given kind of wood gives a color darker than the wood from which the sawdust is formed. Hence I make use of a fraction of sawdust from light-colored woods to aid in producing any desired color.

The strength of the glue solution and the proportions of sawdust to be mingled therewith vary greatly; and I do not mean to confine my invention to any specific proportions of the ingredients. I, however, mingle the parts in such proportions that by kneading and working the mass it assumes, at a temperature at which it can be conveniently handled, a consistency about equal to that of stiff dough for bread.

The surfaces of the molds I oil, to prevent adhesion of the compound thereunto.

After packing the mold with the compound as well as can be conveniently done by hand, I heap the mold with the compound, and submit it to the action of a powerful press, and as soon afterward as the compound has become sufficiently set I remove it from the mold and leave the ornament to dry and season, after which it may be dressed or worked with tools such as are employed by wood-workers, and it may be oiled, polished, or varnished, and secured, where it is to remain, on furniture or other objects, by glue, screws, or nails.

By the use of the term "sawdust" I do not mean to confine myself exclusively to the dust or granulation of wood made by the action of saws, as I consider for the purposes of my invention that woody matter reduced to granules or dust, by grinding or otherwise, will be the equivalent of sawdust, and I contemplate the use of bark from which the tannic acid may have or may not have been removed for the dust or granulated woody matter to be mixed in whole or in part with glue in solution.

Various pigments may be used in the composition for the purpose of coloring it; but to imitate wood these will not be needed, as a judicious mixture of sawdust from various woods will produce almost any color found in woods.

Effects of the natural marking, or the grain or branch of wood, may be produced by the blending of different mixtures while they are in a plastic state.

To render the ornaments tenacious and less brittle and hard when in a dry state, I mix with the glue a portion of oil, preferably linseed, varying the proportion according to the effect as to tenacity and hardness which I desire to produce in the ornaments, and this use of oil in the combination of glue and sawdust for the purpose specified is a part of my invention.

I claim—

As a new manufacture, articles made in molds, and under pressure, of the ingredients specified, with or without the use of oil, substantially as described.

WILLIAM B. GLEASON.

Witnesses:
 FRANCIS GOULD,
 L. H. LATIMER.